United States Patent
Schmunk

[11] 3,878,685
[45] Apr. 22, 1975

[54] SEPTIC TANK DRAINAGE TILE
[75] Inventor: John D. Schmunk, Findlay, Ohio
[73] Assignee: The Hancock Brick and Tile Company, Findlay, Ohio
[22] Filed: Mar. 11, 1970
[21] Appl. No.: 18,530

[52] U.S. Cl. .................. 61/11; 61/13; 138/121; 138/178
[51] Int. Cl. .................. E02b 11/00; F16l 11/12
[58] Field of Search ........... 61/11, 10, 13, 12; 138/121, 173

[56] References Cited
UNITED STATES PATENTS

| 3,330,303 | 7/1967 | Fochler | 138/121 X |
| 3,374,634 | 3/1968 | Fochler | 61/10 |
| 3,440,822 | 4/1969 | Hegler | 61/10 |
| 3,566,607 | 3/1971 | Sixt | 61/11 |

Primary Examiner—Jacob Shapiro
Attorney, Agent, or Firm—Fay & Sharpe

[57] ABSTRACT

A septic tank drainage tile including a corrugated elongated tube of polymeric material. The corrugations are equally spaced from each other with the exception of periodic circumferential flats which have a width equal to the width of two roots and one crest. The flats are located at the root or minor diameter level of the corrugated tube and form drainage channels on the outside of the tile. Relatively large annularly spaced openings in the flats have an axial dimension less than the width of the flat but greater than the width of the roots.

17 Claims, 5 Drawing Figures

INVENTOR.
JOHN D. SCHMUNK

SEPTIC TANK DRAINAGE TILE

BACKGROUND OF THE INVENTION

Septic tanks are commonly used to collect and dispose of waste. As illustrated in Van Nostrand's Scientific Encyclopedia, page 1483, Third Edition, January 1958, (D. Van Nostrand Company, Inc., Princeton, New Jersey) a septic tank is usually a liquid-tight cylindrical container buried in the ground. A sewer inlet line connects and transmits the waste from a source such as a house to the septic tank. An effluent outlet line draws the liquids in the tank from below the liquid surface level but well above the base to minimize floating or sunken solids from entering the outlet line.

Raw sewage enters the tank from the intake and settles to the bottom. A thick scum forms on the surface of the liquid and effectively cuts off the contents from oxygen. Bacterial action occurs in this isolated atmosphere which converts most of the suspended solids into liquids and gases. The gases are discharged through vents and the liquids exit through the effluent outlet. A branching pipe system of perforated septic drain tile receives the effluent from the outlet and drains it into a nearby leach bed.

The distribution of effluent by the septic tile is an important function in the septic system. Accordingly the septic tile must be sturdy enough to withstand the forces which may include transient machinery placed upon it when in position under the ground. If the septic tile is rigid and/or weak it may simply crack and break. Soil could then enter the septic tile and clog it with the result that the effluent would fill the septic tank and back up to the source.

The design of the drainage tile must also permit the effluent to readily drain without clogging. Keeping the openings in the septic tile unclogged is a problem because the discharged liquid effluent usually builds up salt deposits around the edge of the openings. As the opening contracts due to salt deposits solid particles in the effluent can more readily become lodged in the opening. Clogging of the septic tile by effluent back-up would again result.

Clay tile is frequently used with septic tanks. However, if relatively large openings for effluent drainage are placed in the wall of the tile it will seriously weaken its structure. The combination of the weakened structure and the rigidity of clay tile could easily result in failure. This is particularly true if heavy equipment passes over the area in which the tile is buried. Failure of the clay tile would cause soil to enter the septic tile and at best reduce its efficiency.

If small openings are used in clay septic tile salt deposits cause a problem. The relatively large wall thickness of clay tile encourages rapid salt build up at the circumference of the opening. A reduced diameter of the opening quickly impairs the drainage capacity of the septic tile.

Corrugated polymeric drainage tile is highly desirable because of its flexibility and thin wall structure. Its resiliency greatly reduces fractures from a load and its thin wall inhibits build up of salt at its periphery. However, corrugated tile presents a particular drainage problem when used as septic tile. The corrugations have roots, side walls, and crests approximately one-quarter of an inch wide, for example. Since the drainage openings are normally located in the root or side wall of the corrugations they are therefore limited to that dimension. Any larger opening would sever adjacent corrugations and significantly weaken the structure of the tile. As a practical matter these openings are therefore narrow and easily clogged by any solids in the effluent. As a result, the usual corrugated drainage tile has not been found completely satisfactory for the purpose of a disposal system for a septic tank.

This invention has provided a solution to the clogging problem of corrugated septic drainage tile. It provides widened areas or flats at the root level spaced along the tile at intervals among the normal corrugations. Relatively large drainage openings which cannot easily be clogged are placed in the flats.

The use of a flat with the drainage opening is particularly advantageous. It permits the use of a relatively large opening without the necessity of severing the corrugations. This result is highly desirable because the corrugations add substantial strength and flexibility to the tubing.

The placement of the opening at the root level is recommended because natural channels are formed on the outside of the tile by the flats between the adjacent crests. These channels are not normally filled with soil and readily accept the effluent from the opening at the root. In use these channels effectively act as small catch basins or holding tanks and allow the effluent to be absorbed about the entire circumference of the tile. By way of contrast, if the openings were at the crests they would in effect be abutting against the soil. The effluent would therefore have to drain at that one spot.

It is also common to cover the drainage tile with a shroud such as tar paper or fabric before backfilling. In this case the channels formed by the roots even on the upper side of the tile would be particularly effective and would be kept clear of soil for an indefinite period of time.

This invention provides for two basic configurations of the drainage tile, a three-opening embodiment and a twoopening embodiment. The three-opening septic tile has a complete circumferential flat with annularly spaced openings at approximately 120° apart at a given cross section. The flats with the openings are repeated at intervals along the length of the tile.

The use of the two-opening septic tile in a semi-circular flat simply eliminates one of the openings of the three-opening configuration. The remaining two openings are again 120° apart. The two-opening configuration of septic tile may be used in two manners. In one system the tile is positioned so that the two openings are located in the upper half of the tile. Sediments or solids therefore settle to the bottom of the tile and do not discharge through the relatively high openings. This substantially eliminates the problem of blocking the openings by accumulated waste matter. Moreover, the accumulated waste matter in the bottom of the septic tile can be flushed out periodically.

In particular installations where the back fill material is a type of stone or sand particles that would readily enter any holes located above the lower half, the two-opening tile system may be inverted. In this instance, the two holes are located on the lower half and serves as a conventional distribution channel and act in much the same way as the threehole system.

ABSTRACT OF THE INVENTION

A drainage tile for collection and dispersements of liquid and solid materials suspended therein, including an elongated tube of polymeric material. The tube has corrugations to enhance resistance to compressive forces while permitting flexing and bending and maximize the strength to weight ratio. The corrugations have roots and crests with periodic flats formed at the root level with a width substantially greater than any of the roots. Annularly spaced openings in the flats have an axial dimension greater than the width of the other roots in order to permit the efficient flow of liquid and solid matter to exit from the tube without clogging the openings and to permit the liquid and solid matter to be dispersed in the surrounding soil with the aid of the natural channels formed by the outside of the flats.

PREFERRED EMBODIMENT

Figure 1:
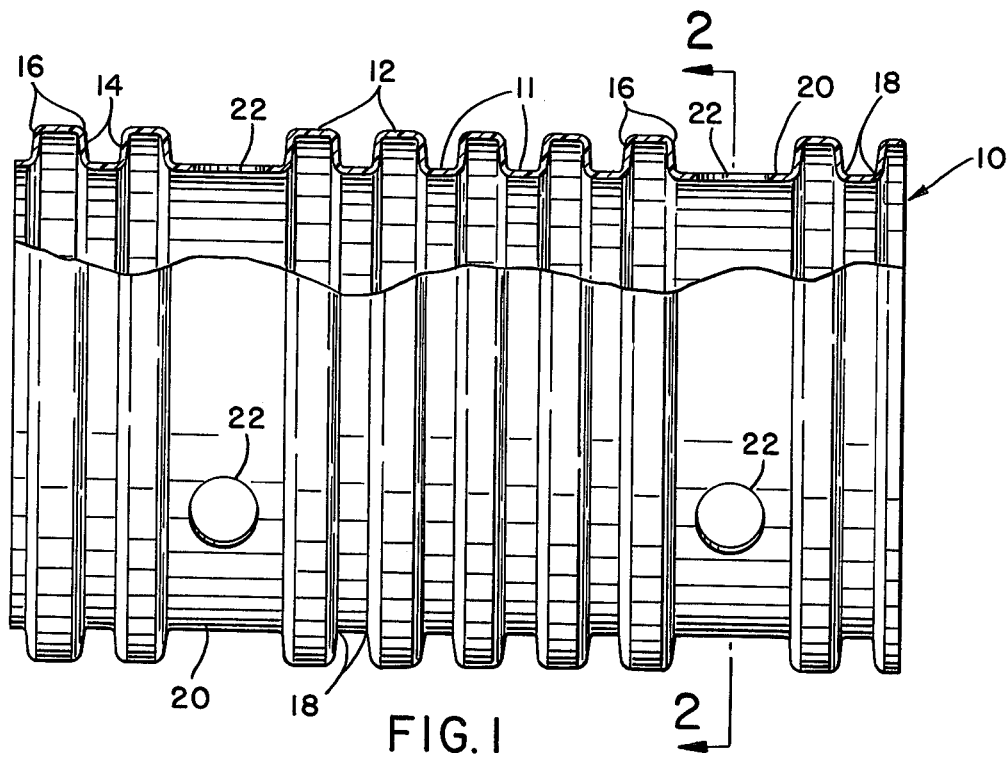
FIG. 1 is a side plan view partially cut away of a section of the three-opening embodiment of the septic tile of this invention.
Figure 2:
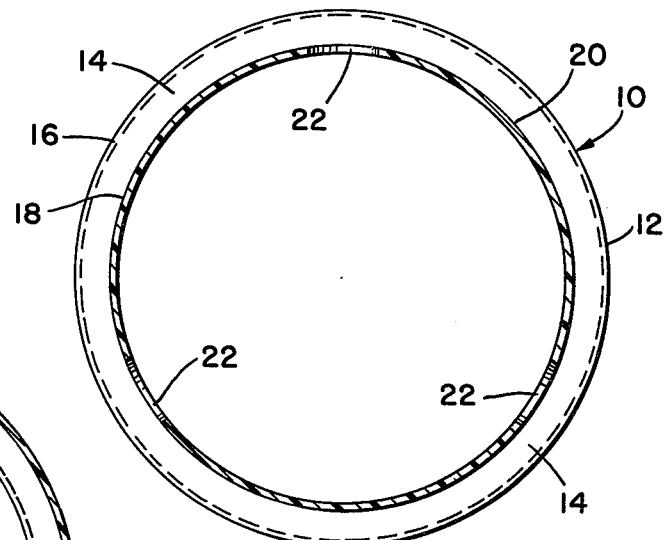
FIG. 2 is a sectional view taken along line 2—2 of FIG. 1 and shows a cross-sectional view of the septic tile.

As illustrated in FIGS. 1 and 2 the three-hole embodiment of this invention includes a corrugated, elongated tube 10 formed of a polymeric material such as polyethylene, polypropylene, polyvinylchloride or any other suitable polymeric material. Roots 11 are joined to the crest 12 by means of corrugation walls 14. The polymeric material is resilient and flexible and when formed into corrugations upon inner and outer surface allows the tube to bend while still retaining its strength. The corrugation walls 14 taper upwardly and inwardly to form slightly rounded corners 16 with the crests 12. It will be understood that the slight relief of the walls 14 facilitate removal of the tile from the dies in which it is formed. The crests 12 are relatively flat and form the greater or major diameter of the cylindrical tile illustrated in FIG. 1.

The roots 11 are joined to the walls 14 by slightly rounded corners or fillets 18. The roots are generally flat and form the smaller or minor diameter of the corrugated cylindrical tile.

As can be readily appreciated from a consideration of the shape of the corrugations and the nature of the polymeric material which is usually polyvinylchloride, polyethylene, or a similar material that the septic tile can be compressed in accordion-like fashion or bent about its longitudinal axis in order to position it as desired. The diameter of the septic tile may vary, but four inches is a commonly used size.

Periodically, in this case, every five corrugations, flats 20 pass around the entire circumference of the drainage tile 10. The flats give the appearance that one of the crests 12 has been flatened so that it has a width equal to approximately two roots and one crest. While the width of the flat is not critical and may vary it should be large enough to permit an opening much larger than that usually found in corrugated drainage tile without interfering with the corrugations. It is important, however, that the openings be considerably larger than the width of a corrugation root or crest. In four or five inch diameter septic tile the width 20 of the flat has been successfully made to one inch thereby permitting openings 22 to have a one-half inch or larger diameter without interfering with adjacent corrugations to the flat. In the embodiment shown in FIGS. 1 and 2, three of the openings 22 are located in each circumferential flat. This is particularly noted in FIG. 2 where the three openings 22 are equally spaced 120° apart. The three opening septic tile is popular because it can be placed in a trench almost at random and one of the openings will be near the bottom.

Figure 5:
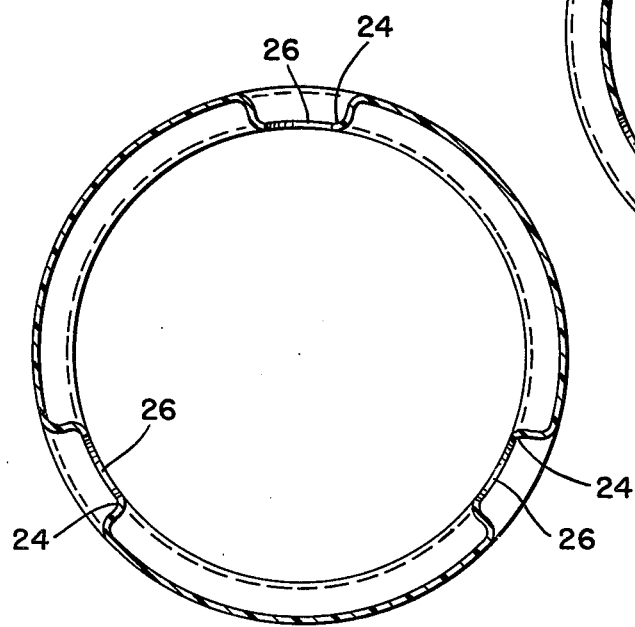
FIG. 5 is a cross-sectional view of the three-hole embodiment having periodic flats for the openings.

A modification of the septic drainage tile illustrated in FIGS. 1 and 2 is shown in FIG. 5. It differs only in that it has three spot flats 24 positioned around the periphery of the tile, instead of a continuous circumferential flat, in which openings 26 are located. That is, the crest of one corrugation is interrupted three times by flat areas in which the openings are located. In this embodiment the crest of interrupted corrugation is tapered into the flat in order to preserve the structural integrity of the tile. The width of the flats are generally the same as that shown in FIG. 1 and are equal to two roots and the width of one crest taking into account any taper in the walls that would add to the width of the crest. Again the actual width of the flat is not critical but it should be adequate to accommodate an opening considerably larger than the width of a crest or root.

Figure 3:
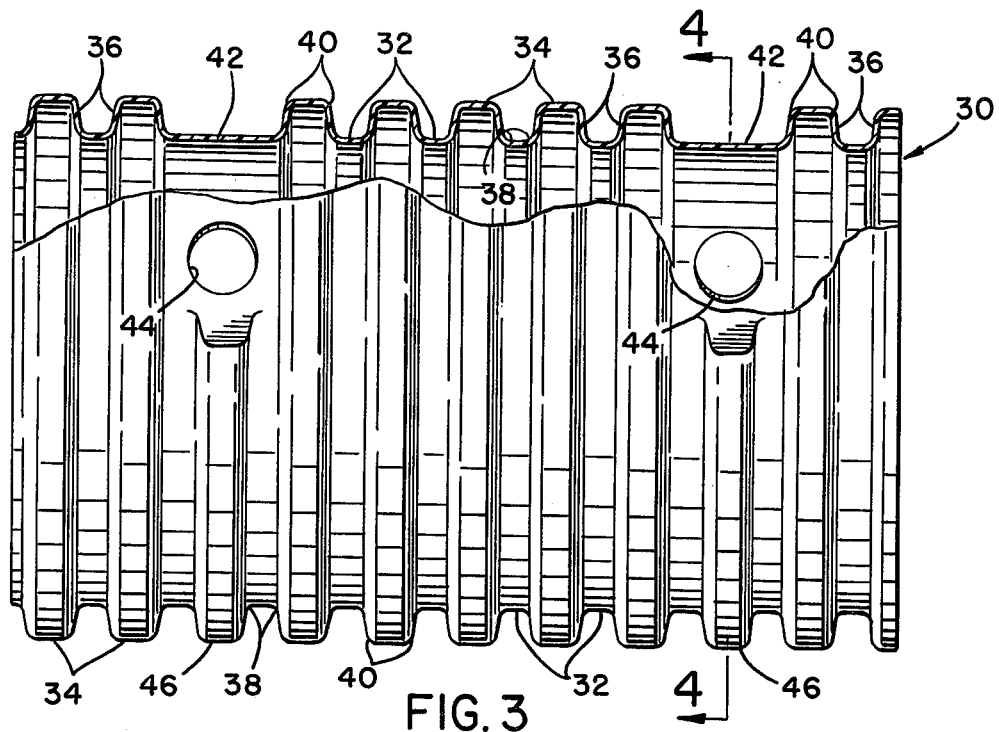
FIG. 3 is a side plan view partially cut away of the two-opening embodiment of the septic tile of this invention.
Figure 4:
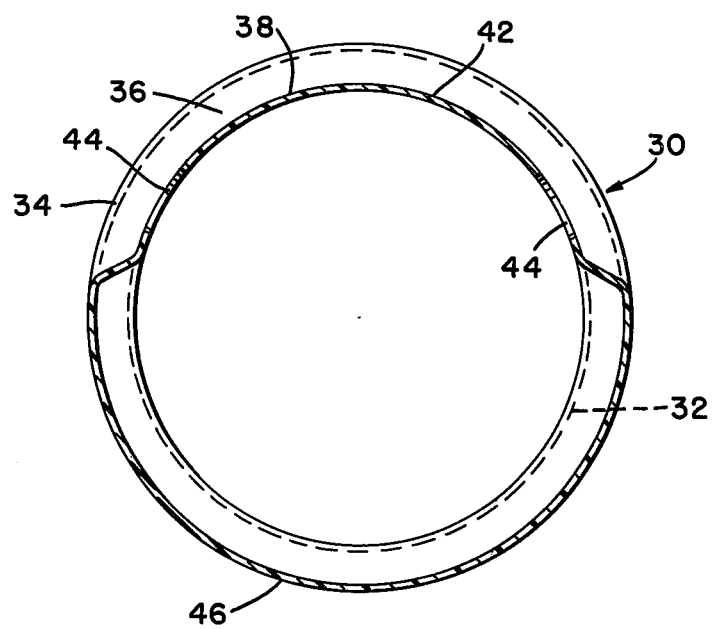
FIG. 4 is a sectional view taken through 4—4 of FIG. 3 and shows a front cross-sectional view of the two-hole embodiment.

As illustrated in FIGS. 3 and 4 a two-opening embodiment of the drainage tile 30 has the typical roots 32 and crests 34 joined by upwardly and inwardly tapered corrugation walls 36. The walls 36 join the roots 32 at relatively rounded corners 38 or fillets and the crests 34 by rounded corners 40. Again the corrugated drainage tile 30 has spaced flats 42 which have a width equal to approximately two roots and a crest taking into account any taper on the wall which adds to the width. As a specific example one half inch diameter openings 44 in one inch wide flats 42 on four inch diameter tile has been found to be successful. It is anticipated, however, that other dimensions will be satisfactory. As noted in FIG. 4 there are two openings 44 spaced 120° apart and equally spaced from a vertical plane passing through the longitudinal axis of the tile. Since the third hole is not present, a partial corrugation 46 is used in approximately the lower half of the drainage tile 30.

As noted earlier, there are two basic uses of the two-opening configuration septic tile. The primary use is in a system where the two-opening drainage tile is placed in the trench in the orientation illustrated in FIG. 4 with the openings 44 above the center line. When so used any solids will settle to the bottom of the tile and will not discharge through the holes. This helps to eliminate the problem of partial or total blocking of the openings by accumulated effluent. Any accumulation of waste matter in the bottom of the line can be flushed. Again, it is helpful if a tar paper or fabric is used as a shroud before the back fill is laid over the line.

The second type of use of the two-hole embodiment is where the two openings are placed below the horizontal center line. This is advantageous where the back fill comprises relatively small particles of stone, sand, or soil which could readily enter any openings above the center line thus clogging or at least reducing the efficiency of the septic tile. In this instance, the two-hole septic tile will serve as a conventional distribution channel.

In summary all of the embodiments shown in FIGS. 1 through 5 the openings are located at the roots in order to allow the effluent to drain within the natural channels formed by the roots and flats. These channels may also act as a limited catch basin for solids once they pass out of the septic tile. The channels are particularly effective to permit the effluent to drain if the drainage tile is covered with a protective shroud before the back fill is placed around it.

The use of a relatively large drainage opening at the root level of a thin wall corrugated pipe minimizes the build up of salt at the openings and the loss of structural integrity. In the crest any reduction in efficiency caused by the build up of salt at the opening or solids in the effluent.

The invention claimed is:

1. A flexible corrugated tube having alternating substantially flat annular peak portions and substantially flat annular valley portions, walls interconnecting the peak and valley portions, at least one recess in one of the peak portions having a bottom contiguous with the valley portions opposite that peak portion, peak end walls at the recess closing the peak portion in which the recess is located, and an opening in the recess for providing communication between the interior and exterior of the tube.

2. A flexible corrugated tube as in claim 1 wherein the opening is circular.

3. A flexible corrugated tube as in claim 2 wherein the opening extends into the valley portions opposite the peak portion having the recess.

4. A flexible corrugated tube as in claim 1 wherein one annular peak portion of each group of a predetermined number of adjacent peak portions has a pair of spaced apart recesses.

5. A flexible corrugated tube as in claim 4 wherein the recesses of each pair are spaced apart 120°.

6. A flexible corrugated tube as in claim 5 wherein each opening is circular.

7. A flexible corrugated tube as in claim 6 wherein each opening extends into the valley portions opposite the peak portion having the recesses.

8. An effluent exfiltration and disposal tubing for use in connection with a septic tank leach bed to receive and disperse a solids-containing liquid effluent comprising: an elongated tube of polymeric material; said tube having corrugations upon the inner and outer surfaces thereof with roots and crests to enhance resistance to compressive forces while permitting flexing and bending whereby the inner corrugations serve as successive settling beds for the solids-containing liquid thereby to separate and deposit in the corrugations at least a portion of the solids contained in the liquid; periodic flats along the length of the tubing disposed generally at the minor diameter of the corrugations having a width substantially greater than the width of the other roots; spaced discharge openings in the periodic flats, for passage of the solids-containing liquid from the tube into a filter bed of aggregate having a particle size greater than the size of the openings whereby any remaining solids may be carried from the proximity of the openings into the interstices of the aggregate without clogging said openings; said openings having an axial dimension greater than the width of the other roots.

9. The drainage tile of claim 1 wherein the periodic flats pass completely around the circumference of the tube.

10. The drainage tile of claim 9 wherein the annularly spaced openings are equally spaced around the circumference of the tube in the periodic flats which have a width equal to approximately two roots and a crest.

11. The drainage tile of claim 10 wherein the annularly spaced openings are circular and are spaced at 120° apart.

12. A drainage tile or collection and dispersement of liquids and solid materials suspended therein comprising:
an elongated tube of polymeric material;
said tube having corrugations upon the inner and outer surfaces thereof with roots and crests to enhance resistance to compressive forces while permitting flexing and bending;
periodic flats along the length of the tile disposed generally at the minor diameter of the corrugations having a width substantially greater than the width of the other roots;
each of said periodic flats extending around only a fraction of the circumference of the tubing;
at least one opening in each of the periodic flats, each annularly spaced opening having an axial dimension greater than the width of the other roots in order to allow liquid and solid matter to exit from the tube without clogging the openings and to permit the liquid and solid matter to be dispersed in the surrounding soil.

13. The drainage tile of claim 12 wherein each periodic flat extends around the circumference of the tubing no greater than approximately one-half of the total circumference.

14. The drainage tile of claim 12 wherein the flat extends around the circumference of the tubing no greater than approximately one-half of the total circumference and has a plurality of openings therein.

15. The drainage tile of claim 12 wherein a plurality of flats each extend less than one-third of the circumference.

16. The drainage tile of claim 12 wherein the flats are intermittent among segments of a corrugation with circular openings in each flat.

17. The drainage tile of claim 12 wherein the periodic flats have a width equal to two root sections and a crest.

* * * * *